United States Patent

[11] 3,621,265

[72] Inventor Robert M. Berler
Westport, Conn.
[21] Appl. No. 845,860
[22] Filed July 29, 1969
[45] Patented Nov. 16, 1971
[73] Assignee Pitney Bowes-Alpex, Inc.
Danbury, Conn.

[54] HAND HELD CODED DOCUMENT READER INTO WHICH DOCUMENT IS FIRST INSERTED AND THEN READ AS IT IS WITHDRAWN
3 Claims, 5 Drawing Figs.

[52] U.S. Cl. .......... 250/219 D, 235/61.11 E, 250/219 DC
[51] Int. Cl. .......... G01n 21/30, G06k 7/00
[50] Field of Search .......... 250/219 DD, 219 DC, 234, 235, 219 D; 235/61.11 E, 61.11 CR

[56] References Cited
UNITED STATES PATENTS

| | | | |
|---|---|---|---|
| 3,456,117 | 7/1969 | Ritzert .......... | 250/219 DD |
| 3,509,354 | 4/1970 | Reilly .......... | 250/219 DD |

OTHER REFERENCES

Nassimbene, E. G.; " An Order Entry Device and System," IBM Technical Disclosure Bulletin, Vol. 6, No. 12, May 1964, pg. 56

Patterson, J. L., " Card Reader Timing Pulse Generator," IBM Technical Disclosure Bulletin, Vol. 7, No. 1, June 1964, pg. 55

*Primary Examiner*—Archie R. Borchelt
*Assistant Examiner*—T. N. Grigsby
*Attorney*—Arthur J. Plantamura

ABSTRACT: A device held in the hand for reading intelligence contained on a document in the form of coded punched holes. The device includes a slot to receive the document, a light source positioned on one side of the slot and aligned with the light source on the other side of the slot is a light detector means comprising one or more photocells. A suitably formed housing capable of substantially excluding light contains the document-receiving slot, the light source and photocell detector.

INVENTOR.
ROBERT M. BERLER
BY:
Arthur J. Plantamura
ATTORNEY.

INVENTOR.
ROBERT M. BERLER
BY:
Arthur J. Plantamura
ATTORNEY.

HAND HELD CODED DOCUMENT READER INTO WHICH DOCUMENT IS FIRST INSERTED AND THEN READ AS IT IS WITHDRAWN

This invention relates to a compact device which may be held in the hand for reading coded information by optical means from a document containing data in a punched hole coded format.

Among the many situations in which a convenient form of merchandise accounting and inventory is desirable, is that presented at the point of sale especially where there is a heavy turnover and/or a large number of different items are sold. The items may be conveniently tagged with a punched hole card fastened to the article by a string or by other suitable fastening means.

It will be apparent from the description which follows that the device of the present invention may find advantageous applications in various areas in which a rapid computerized record of merchandise turnover is desired, the novel device, however, will be primarily described with particular reference to its use in controlling inventory at the point of sale so as to afford a more precise understanding of its nature.

Currently there is an excessive amount of manual work and usually a costly timelag involved in the processing of information concerning sales of items and consequently in ascertaining accounts of remaining inventories. One method in common usage involves tearing off punched hole stubs from tickets attached to merchandise and transferring these stubs to a central location where they are fed to a reader. There are various drawbacks to this arrangement, e.g. delay, loss of stubs, etc. The present invention which gathers information immediately at the time of the transaction greatly facilitates the processing of the needed information to the appropriate office charged with responsibility for taking action, such as the resupplying of depleted stock in department stores, for example.

It is an object of this invention to provide a novel reading device which is held in the hand for use in connection with data-handling systems.

It is still another object of the invention to provide a card or ticket reader which is devised to be held in the hand and which is capable of accepting information from a ticket or a card which may remain fastened to merchandise.

It is another more specific object of the invention to provide a compact punched hole document reader which is conveniently held in the hand and may be applied to reading a document which is affixed to an article of merchandise and which produces a readout of excellent signal to noise ratio.

These and other objects of the present invention will become more fully apparent from the following description when considered in conjunction with the accompanying drawing wherein.

Figure 1:
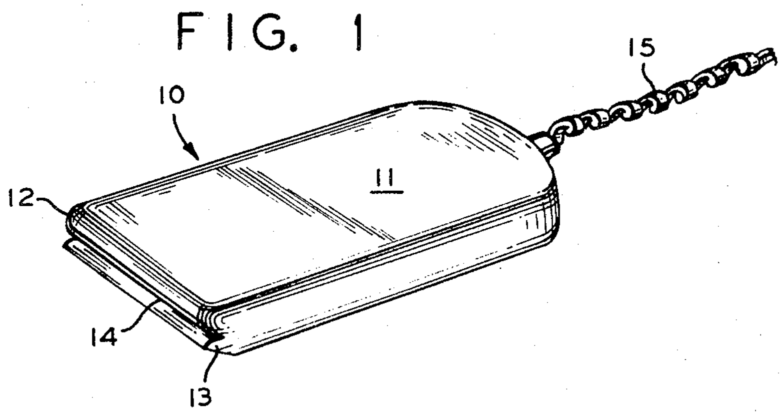
FIG. 1 is a perspective view of the manually held reading device.
Figure 2:
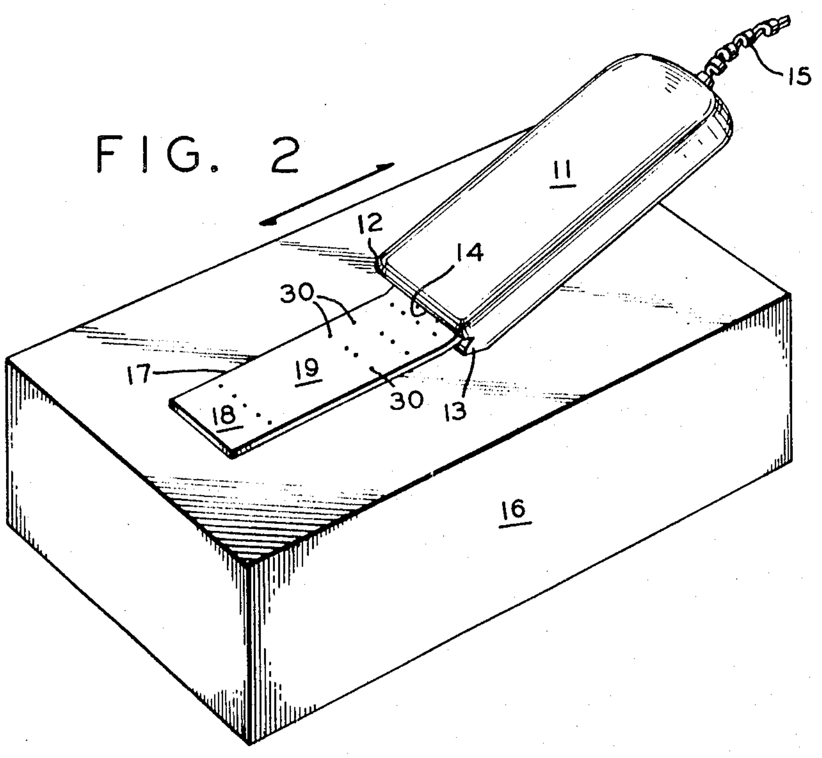
FIG. 2 illustrates one mode of use for the reader of the invention wherein it is employed to read a coded document which is adhered to a package.

The apparatus of the present invention is an optical ticket or card reader that reads a punched hole coded format by optical means. Although it will be understood that the reader of the invention can be adapted to read various types of punched cards, the present invention will be described in connection with a punched ticket-type format, such as is conventionally used on articles of merchandise. One such document, for example, is the "OHR-TRONICS TYPE" which is available commercially from Mohawk Data Sciences Corporation. Using documents of this type, the reader is able to read the information from a ticket which is secured to a container or package for example by a string or cord passing through a hole in the ticket. Of particular advantage is the fact that the reader can be used to read a ticket which is partially secured, such as by a stick-on adhesive, on one face of a large package such as shown in FIG. 2, without removing it from the package, a feat which cannot be conveniently effected with a conventional desk top reader.

While the size of the device of the invention may vary significantly, it should be no larger than that which may be conveniently used manually. In particular, the size of the device may be based upon the Fairchild FPA-700 nine-element photocell array* for sensing holes although it will be apparent that other suitable numbers of elements may be employed. Illumination may be provided by tiny lens-type lamps such as the 9L lamps (size T-$^3/_4$) made by Los Angeles Miniature Products, Inc. These lamps are especially designed to illuminate photocell arrays through punched documents, are extremely rugged, and have a life expectancy of 100,000 hours (about 11 years). In essence, with the above components a hand-held reader about the size of a standard two-cell flashlight and of a convenient shape, e.g. oval in cross section is readily formed. A few feet of flexible cable containing all sensor and illuminating wires is attached at the rear part of reader and connects at the other end, to a data processor unit. The reader may be conveniently provided with a securing means (not shown) when not in use, e.g. it may be hung up on a hook or placed in a suitable supporting cradle when it is at rest awaiting use by the salesperson. The connecting cable may be retractable (not shown) or coiled much as a conventional telephone cord.

* Fairchild Camera & Instrument Corp. Fairchild Semiconductor Division.

The type of ticket which may be employed with the reader of the invention is the OHR-TRONICS-type ticket. This ticket has the same hole spacing and is the same width as standard teletype punched tape. The Fairchild FPA-700 photocell array is specifically suitable for reading relatively narrow widths e.g. teletype tape. It will be understood that the hand-held ticket reader is not limited to the OHR-TRONICS-type tickets alone. With modifications apparent to those skilled in the art, it may be adapted to read other types of tickets. However, to facilitate the description of the invention in detail the ticket reader will be described for reading a teletype-type ticket.

Figure 3:
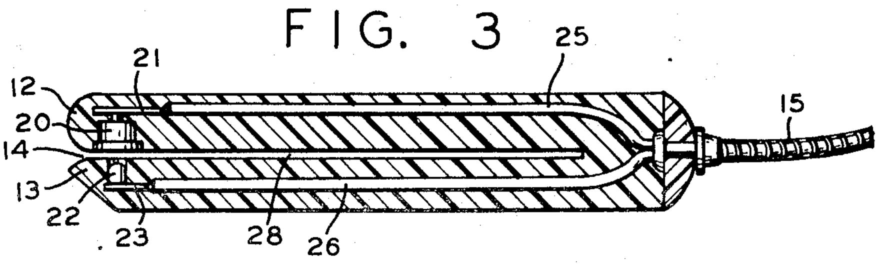
FIG. 3 is a cross-sectional view of the reader illustrating the functional elements.
Figure 4:
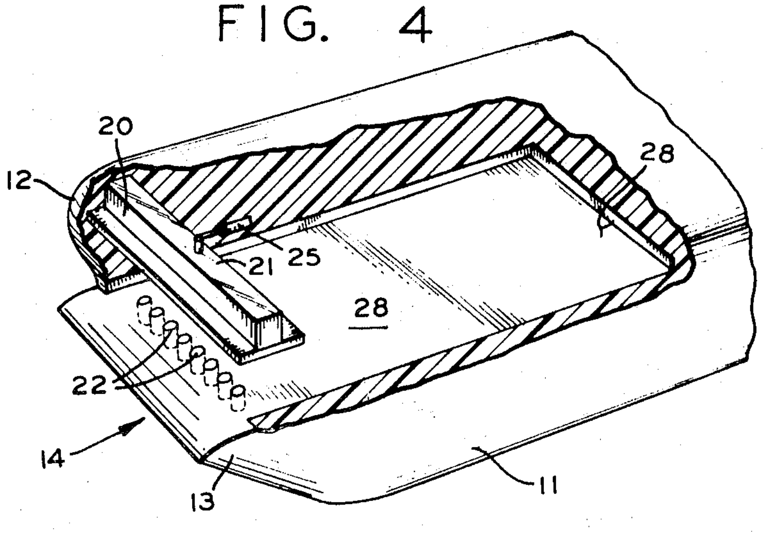
FIG. 4 is an enlarged fragmentary view of the coded document receiving end of the reader of the invention showing the light source and photoelectric sensors in greater detail.

Referring to the drawing, it is seen that reader 10 comprises a suitably shaped unit which may be comfortably gripped in the hand when in use. The body or case 11 of the reader is formed of a suitable material, e.g. a synthetic resinous composition preferably having good impact, e.g. nylon, polypropylene, polycarbonate, and the like. The body 11 is formed so as to have a suitable opening 14, to receive the ticket to be read, at one end and an electrical cord 15, connected at the other end, for transmission of the electrical impulses sensed from the punched hole document. The lips 12 and 13 at the mouth of the slot opening 14 are molded or otherwise contoured so as to offer a suitable shape. At least the bottom lip 13 is preferably formed so as to have a chisel shape which facilitates insertion of a ticket 17 which may be affixed to a package 16 as shown on FIG. 2. The ticket 17 is affixed to the package 16 so that it lies flat, however, it is adhesively secured only on end portion 18. When the chisel portion 13 of reader 10 is applied on the face of package 16 at the free end of the ticket 19, it conveniently pries up the ticket and guides portion 19 into the slot 28 (through opening 14) of the reader. Referring to FIGS. 3 and 4, the relationship of the photocell array 20 to the lamp bank 22 is shown in greater detail.

The photocell array 20 and lamp bank 22 are suitably mounted on conventional printed boards 21 and 23, respectively which in turn are connected via wires 25 and 26 to a decoder.

Figure 5:
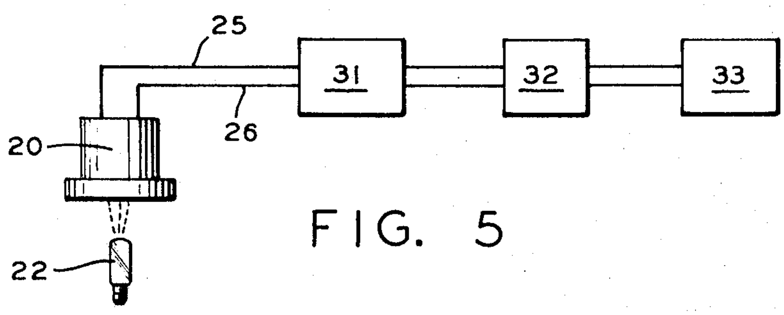
FIG. 5 is a block diagram depicting logic circuits useable with, and aiding in better understanding the functioning of, the reader of the invention.

FIG. 5 illustrates a schematic arrangement which may be used for translating light impulses generated by light passing through holes 30 in the ticket 17 onto the photocell array 20. The light impulses are processed in a conventional manner such as through the amplifier 31 and decoder 32 to produce the desired electronic signal into a computer 33.

The ticket reader of the invention is used as follows. For the situation where the ticket is fastened onto an article with a string, the operator will carry the ticket reader to that article, take the ticket in his hand and insert it into the reader. The ticket is then read as it is withdrawn from the reader.

The manner of reading a ticket which is pasted to a box is illustrated in FIG. 2. The operation involves a convenient and rapid insertion of the ticket into the slot 14. When the operator moves the reader over the surface of the box, as shown by the arrow, the chisel edge on the lower lip 13 of the ticket slot pries up the ticket and guides it into the slot for reading. When the reader is backed off the ticket, it will provide the readout.

The actual ticket-reading operation will be analogous to that used with the reading device described in my copending patent application filed on Jan. 31, 1969, Ser. No. 795,632, now U.S. Pat. No. 3,582,617 in that the ticket will be manually inserted into the reader. Upon withdrawal, the information will be read out. Also, as with the reader of that patent, a special "start-to-read" code will be used to indicate that the entire ticket has been fully inserted into the slot. This code will be the only three-hole combination on the ticket. It typically may be the 4, 7, and check-digit hole. A clock may or may not be used as desired. The "Start" three-hole code will be located near the tie-on string or near the stick-on adhesive end of the ticket, as the case may be.

Although the ticket-reading operation is similar to that of U.S. Pat. No. 3,582,617, there is the important unique feature in the reader of the present invention which enables it to be applied to the article, i.e. brought to the ticket to be read, instead of feeding the ticket to the stationary reader. With some packages, this is the only practical means of getting the information. The punched hole format method of coding and the electronics will be essentially the same as that employed in U.S. Pat. No. 3,582,617. Whereas the illumination of the photocell array in that application was accomplished with a single lamp and collimated light, illumination of the photocell array in the reader of the present invention preferably uses individual lens-tipped lamps, one for each photocell position in the array. Also, although the OHR-TRONICS-type ticket uses five holes (1, 2, 4, 7 and check-hole positions), this reader can be made to utilize the full nine-hole capability of the teletype tape system. When so adapted, the reader will be able to decode the complete alphanumeric code available on the teletype punching systems.

The ticket slot in the reader may be varied so as to read tickets of different lengths, e.g. 4 or 5 inches. In other words, any length ticket up to the maximum slot depth can be accommodated.

As with the system described in U.S. Pat. No. 3,582,617, the electronics system will reject any ticket readout which is of improper format or ticket which has not been fully inserted, or if the reader is jiggled back and forth, or if the holes or ticket are mutilated as described in said patent when a ticket is fully inserted in the slot 14 an output is produced which initiates a start-count pulse and signals a clock pulse counter to count pulses received from a clock photocell. Each time an output from the clock photocell is present, a read pulse will be present at the output of the clock counter. Only when this read pulse is present at the input of an associated decoder can an output or readout be taken from the decoder output. In the absence of a read pulse, the decoder will reset itself. The output of the clock counter is also fed into a circuit which determines whether the clock count is less or greater than the preset value. If the clock count agrees with the present count, no output will be produced from this circuit; the count will be correct and usable. However, if this circuit produces an output, a void signal is generated which activates a no-go alarm, and all circuits are reset. If a ticket is inserted fully into the slot 14 and then pulled out partially, and then left there, the circuits will be automatically reset.

It is thus seen that the hand-held ticket reader of the invention incorporates a number of highly practical features. Included, for example, are the following: It is light in weight and fits easily into the palm of the hand. Because of its size and design, it is extremely maneuverable. This enhances its ability to perform its job. It is mechanically and electrically shockproof. Its relative simplicity renders it substantially trouble free in operation and requires a minimum of maintenance. It is relatively inexpensive.

While the invention has been described with reference to a particular embodiment in order to facilitate a full, clear, and concise explanation, various modifications which will be apparent to those skilled in the art may be made without departing from the scope and spirit of the invention.

What is claimed is:

1. A hand-held coded punched hole document reader comprising a housing which substantially excludes external light, a slot of sufficient depth to receive therein the entire coded portion of a coded document to be read formed in said housing, a mouth in said housing opening to said slot into which a document is inserted and read as it is withdrawn, a photoelectric cell array positioned in said housing contiguous to said opening and on one side of said slot, a light source on the opposite side of said slot aligned so that light therefrom is directed into the respective photocells of the array, means in said reader coordinated with the code on the document to be read enabling the document to be read only after the document has bottomed in said slot, means responsive to the coded information read by said photocells for rejecting erroneous documents or improperly inserted documents, and an electrical connection to said light source and photocells so that electrical signals are produced as a punched hole coded document to be read is withdrawn from the slot between said light source and photoelectric cell array.

2. The reader of claim 1 wherein the configuration of the housing at least on one side of the mouth comprises a chisel shape to assist in lifting and a coded document which is secured on a flat surface and thereby facilitate insertion of said document into the slot.

3. The reader of claim 1 wherein the photoelectric cell array comprises nine distinct photoelectric cells and the light source comprises nine individual corresponding lens-type lamps.

* * * * *